(12) United States Patent
Itzel et al.

(10) Patent No.: US 9,850,763 B2
(45) Date of Patent: Dec. 26, 2017

(54) ARTICLE, AIRFOIL COMPONENT AND METHOD FOR FORMING ARTICLE

(71) Applicant: General Electric Company, Schenectady, NY (US)

(72) Inventors: Gary Michael Itzel, Simpsonville, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 14/812,400

(22) Filed: Jul. 29, 2015

(65) Prior Publication Data

US 2017/0030202 A1 Feb. 2, 2017

(51) Int. Cl.
*F01D 5/18* (2006.01)
*F01D 9/04* (2006.01)
*F01D 25/12* (2006.01)

(52) U.S. Cl.
CPC ............. *F01D 5/188* (2013.01); *F01D 5/189* (2013.01); *F01D 9/041* (2013.01); *F01D 25/12* (2013.01); F05D 2220/32 (2013.01); F05D 2230/22 (2013.01); F05D 2230/30 (2013.01); F05D 2240/127 (2013.01); F05D 2240/128 (2013.01); F05D 2240/30 (2013.01);
(Continued)

(58) Field of Classification Search
CPC .......... F01D 5/188; F01D 5/189; F01D 9/041; F01D 25/12; F05D 2230/22; F05D 2230/30; F05D 2250/185; F05D 2260/201; F05D 2260/202; F05D 2260/941

See application file for complete search history.

(56) References Cited

U.S. PATENT DOCUMENTS 4,252,501 A 2/1981 Peill
6,464,456 B2 10/2002 Darolia et al.
(Continued)

FOREIGN PATENT DOCUMENTS

| EP | 0182588 B1 | 9/1988 |
| EP | 2607624 B1 | 12/2014 |
| GB | 2084262 A | 4/1982 |

*Primary Examiner* — Logan Kraft
*Assistant Examiner* — Peter T Hrubiec
(74) *Attorney, Agent, or Firm* — McNees Wallace & Nurick LLC (57) ABSTRACT

An article is disclosed including a manifold, an article wall, a post-impingement cavity and a plurality of post-impingement partitions. The manifold includes an impingement wall defining a plenum and a plurality of impingement apertures. The article wall includes a plurality of external apertures. The post-impingement cavity is disposed between the manifold and the article wall, and is arranged to receive a fluid from the plenum through the plurality of impingement apertures and exhaust the fluid through the plurality of external apertures. The plurality of post-impingement partitions divide the post-impingement cavity into a plurality of sub-cavities, and hermetically separate the plurality of sub-cavities from one another. The impingement wall, article wall and plurality of post-impingement partitions are integrally formed as a single, continuous article. The article may be an airfoil component. A method for forming the article includes forming a single, continuous object by an additive manufacturing technique.

20 Claims, 7 Drawing Sheets

(52) U.S. Cl.
CPC .. *F05D 2250/185* (2013.01); *F05D 2260/201* (2013.01); *F05D 2260/202* (2013.01); *F05D 2260/2212* (2013.01); *F05D 2260/941* (2013.01)

(56) References Cited

U.S. PATENT DOCUMENTS

| | | |
|---|---|---|
| 6,742,991 B2 | 6/2004 | Soechting et al. |
| 6,769,875 B2 * | 8/2004 | Tiemann ................. F01D 5/189 416/233 |
| 7,121,796 B2 | 10/2006 | Burdgick et al. |
| 7,300,251 B2 | 11/2007 | Kitamura et al. |
| 8,662,844 B2 | 3/2014 | Hada et al. |
| 8,777,569 B1 | 7/2014 | Liang |
| 2011/0027102 A1 * | 2/2011 | Nakamata ............... F01D 5/186 416/97 R |
| 2012/0177478 A1 | 7/2012 | Giri et al. |

* cited by examiner

ARTICLE, AIRFOIL COMPONENT AND METHOD FOR FORMING ARTICLE

FIELD OF THE INVENTION

The present invention is directed to articles and methods for forming articles. More particularly, the present invention is directed to articles integrally formed as single, continuous articles and methods for forming the articles employing additive manufacturing techniques.

BACKGROUND OF THE INVENTION

Gas turbines airfoils such as nozzles are subjected to intense heat and external pressures in the hot gas path. These rigorous operating conditions are exacerbated by advances in the technology, which may include both increased operating temperatures and greater hot gas path pressures. As a result, gas turbine nozzles are sometimes cooled by flowing a fluid through a manifold inserted into the core of the nozzle, which exits the manifold through impingement holes into a post-impingement cavity, and which then exits the post-impingement cavity through apertures in exterior wall of the nozzle, forming a film layer of the fluid on the exterior of the nozzle.

However, flowing the fluid through the manifold in a sufficient volume to cool the entire nozzle decreases efficiency of the gas turbine due to the need to maintain a sufficiently high back-flow margin (post-impingement pressure relative to the gas path pressure) at every external aperture, and to overcome crossflow in the post-impingement cavity. Attempts to divide the post-impingement cavity for better flow control have been inhibited by significant fluid leakage between sub-divided portions at operating conditions, and further, sub-dividing structures may be adversely affected by differential heat expansion and mechanical stresses from turbine operation.

BRIEF DESCRIPTION OF THE INVENTION

In an exemplary embodiment, an article includes a manifold, an article wall, a post-impingement cavity and a plurality of post-impingement partitions. The manifold includes an impingement wall defining a plenum and a plurality of impingement apertures. The article wall includes a plurality of external apertures. The post-impingement cavity is disposed between the manifold and the article wall, and is arranged to receive a fluid from the plenum through the plurality of impingement apertures and exhaust the fluid through the plurality of external apertures. The plurality of post-impingement partitions divide the post-impingement cavity into a plurality of sub-cavities, the plurality of post-impingement partitions hermetically separating the plurality of sub-cavities from one another. The impingement wall, article wall and plurality of post-impingement partitions are integrally formed as a single, continuous article.

In another exemplary embodiment, an airfoil component includes a manifold, an airfoil wall, a post-impingement cavity and a plurality of post-impingement partition. The manifold includes an impingement wall defining a plenum and a plurality of impingement apertures. The airfoil wall includes a plurality of external apertures. The post-impingement cavity is disposed between the manifold and the airfoil wall, and is arranged to receive a fluid from the plenum through the plurality of impingement apertures and exhaust the fluid through the plurality of external apertures. The plurality of post-impingement partitions divide the post-impingement cavity into a plurality of sub-cavities, the plurality of post-impingement partitions hermetically separating the plurality of sub-cavities from one another. The impingement wall, airfoil wall and plurality of post-impingement partitions are integrally formed as a single, continuous article.

In another exemplary embodiment, a method for forming an article includes forming a single, continuous object by an additive manufacturing technique, the single, continuous object including a manifold, an article wall, a post-impingement cavity and a plurality of post-impingement partitions. The manifold includes an impingement wall defining a plenum and a plurality of impingement apertures. The article wall includes a plurality of external apertures. The post-impingement cavity is disposed between the manifold and the article wall, and is arranged to receive a fluid from the plenum through the plurality of impingement apertures and exhaust the fluid through the plurality of external apertures. The plurality of post-impingement partitions divide the post-impingement cavity into a plurality of sub-cavities, the plurality of post-impingement partitions hermetically separating the plurality of sub-cavities from one another.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary articles, airfoil components and methods of forming articles and airfoil component. Embodiments of the present disclosure, in comparison to articles and methods not utilizing one or more features disclosed herein, better accommodate differential thermal expansion, increase tolerance of aerodynamic loads, improve cooling, improve durability, increase efficiency, improve sealing between the impingement walls and article walls, improve local back flow margin, improve film effectiveness and improve manufacturability of complex structures.

Figure 1:
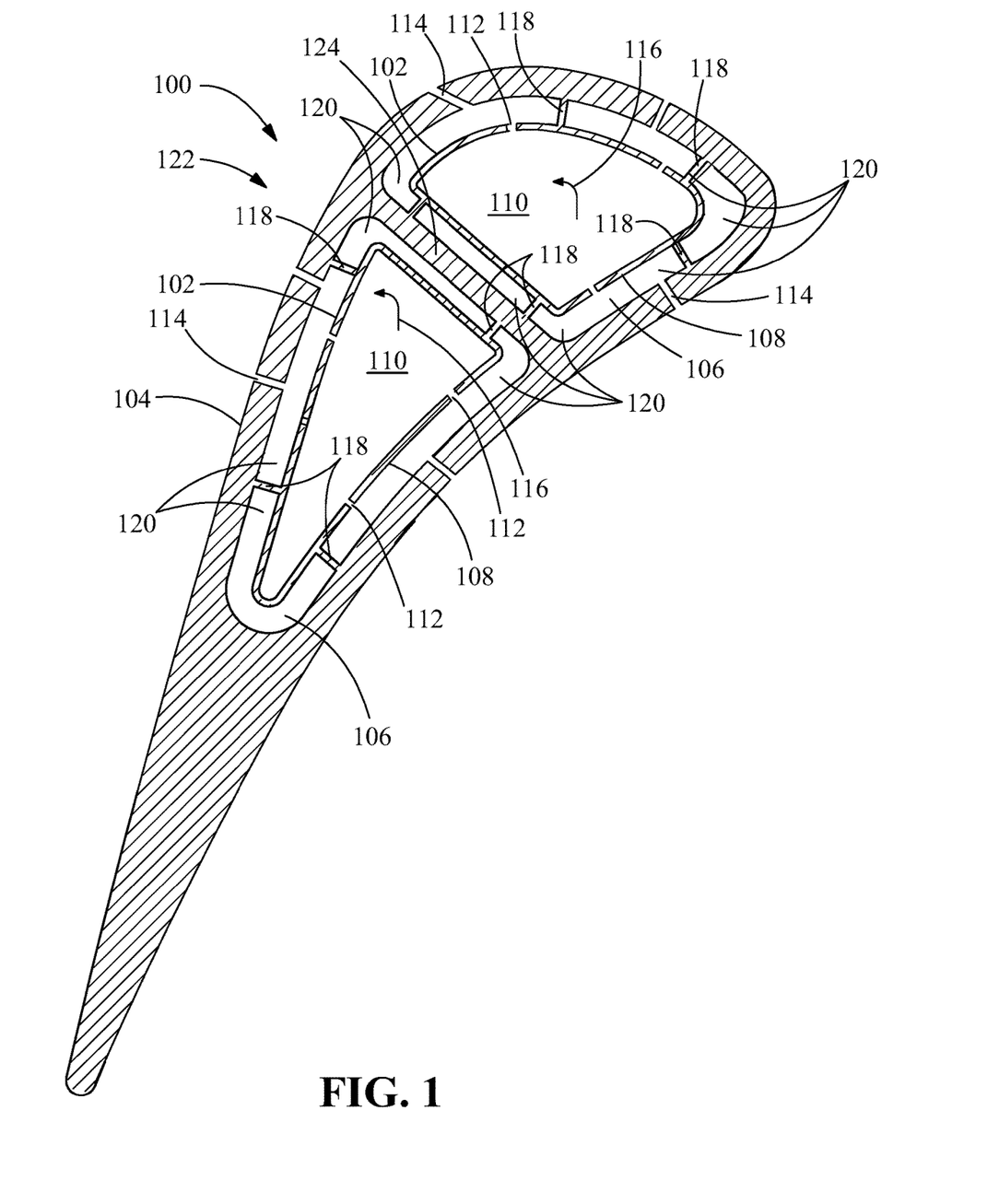
FIG. 1 is a cross-sectional view of an article, according to an embodiment of the present disclosure.

Referring to FIG. 1, in one embodiment an article 100 includes a manifold 102, an article wall 104 and a post-impingement cavity 106, the post-impingement cavity 106 being disposed between the manifold 102 and the article wall 104. The manifold 102 includes an impingement wall 108 defining a plenum 110 and a plurality of impingement apertures 112. The article wall 104 includes a plurality of external apertures 114. The post-impingement cavity 106 is arranged to receive a fluid 116 from the plenum 110 through the plurality of impingement apertures 112 and exhaust the fluid 116 through the plurality of external apertures 114. A plurality of post-impingement partitions 118 divide the post-impingement cavity 106 into a plurality of sub-cavities 120, the plurality of post-impingement partitions 118 hermetically separating the plurality of sub-cavities 120 from one another. The impingement wall 108, article wall 104 and plurality of post-impingement partitions 118 are integrally formed as a single, continuous article. In a further embodiment, the article wall 104 includes a structural spar 124, and at least one post-impingement partition 118 bridging between the manifold 102 and the structural spar 124 across the post-impingement cavity 106.

As used herein, "hermetically separating" indicates that the plurality of sub-cavities 120 are isolated from one another such that the fluid 116 cannot flow directly from one of the plurality of sub-cavities 120 to another of the plurality of sub-cavities. "Hermetically separating" the plurality of sub-cavities 120 does not in any way preclude that more than one of the plurality of sub-cavities 120 may be in fluid communication with the same plenum 110 through the plurality of impingement aperture 112, or with the hot gas path through the plurality of external apertures 114.

The hermetically separated plurality of sub-cavities 120 may reduce or eliminate cross flow of the fluid 116 in the post-impingement cavity 106. As used herein, "crossflow" refers to fluid 116 which flows with inhibited thermal contact with the article wall 104, or which is inhibited from exhausting through a particular external aperture 114 due to the fluid dynamics of the post-impingement cavity. In one embodiment, after the fluid 116 passes through one of the plurality of impingement apertures 112, the fluid 116 impinges on the article wall 104 and flows along one of the plurality of sub-cavities 120 until it reaches and exhausts through one of the plurality of external apertures 114. The plurality of post-impingement partitions which hermetically separate the sub-cavity 120 from the surrounding plurality of sub-cavities 120 prevent the fluid 116 from disrupting and being disrupted by cross flow from upstream jets of the fluid 116 passing through others of the plurality of impingement apertures 112, maintaining the cooling effectiveness of both the upstream fluid 116 and the downstream jets of the fluid 116. The plurality of post-impingement partitions 118 may be disposed and arranged so as to direct flow of the fluid 116 along the article wall 104 in the plurality of sub-cavities 120 so as to reduce cross flow disruption on heat transfer coefficients in regions of the article 100 sensitive to elevated temperatures in comparison to comparable articles lacking the plurality of post-impingement partitions 118.

In one embodiment, the article 100 may be any suitable turbine component, including, but not limited to, an airfoil 122 (shown), a bucket (blade), a nozzle (vane), a shroud, or a combination thereof.

In one embodiment, a method for forming an article 100 includes employing an additive manufacturing technique to integrally form the impingement wall 108, the article wall 104 and the plurality of post-impingement partitions 118 as a single, continuous object. The additive manufacturing technique may include any suitable technique, including, but not limited to, direct metal laser melting, direct metal laser sintering, selective laser melting, selective laser sintering, electron beam melting, laser metal deposition, or combinations thereof.

Figure 2:
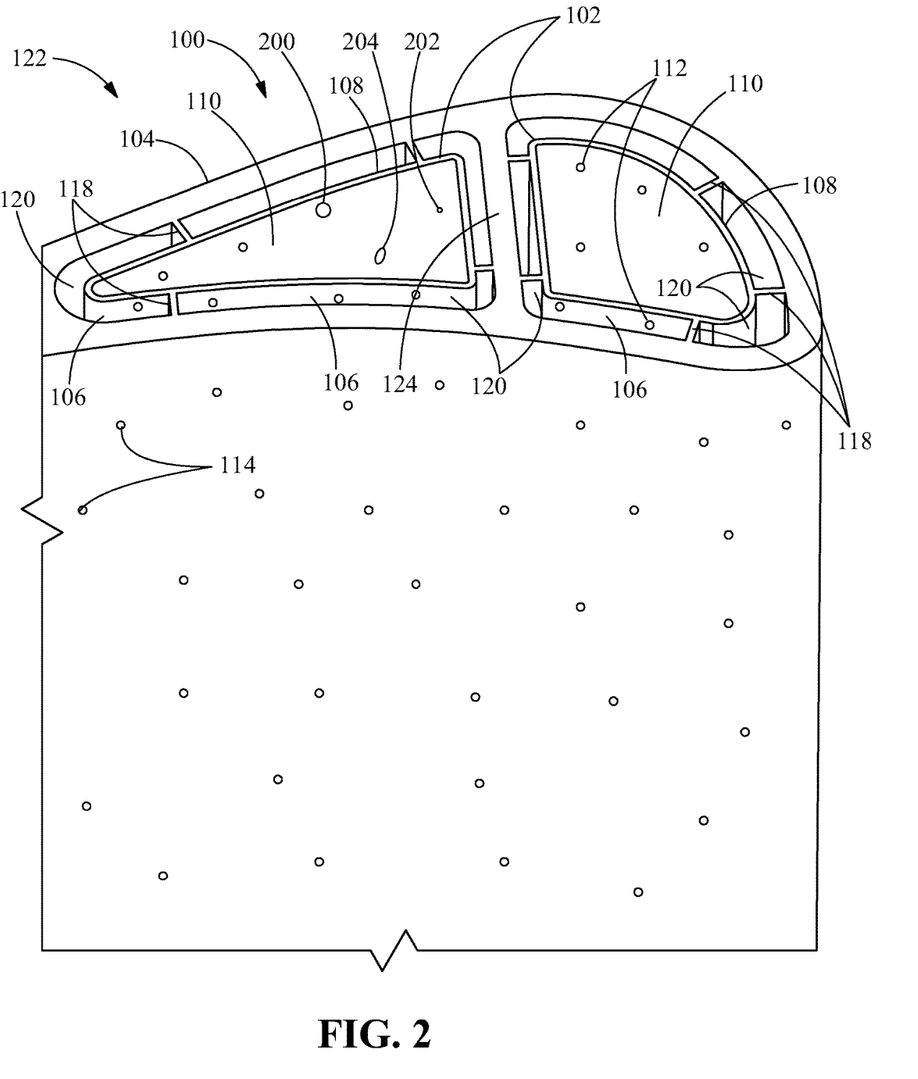
FIG. 2 is a perspective view of the article of FIG. 1, according to an embodiment of the present disclosure.

Referring to FIG. 2, in one embodiment, the impingement wall 108 includes an arrangement and conformations of the plurality of impingement apertures 112 to distribute the fluid 116 to generate a higher heat transfer coefficient in a sub-cavity 120 exposed to higher temperatures as compared to a sub-cavity 120 exposed to a lower temperatures. The conformations of the impingement apertures 112 may include larger cross-sectional areas 200, smaller cross-sectional areas 202, non-circular conformations 204, or combinations thereof to optimize the distribution of the fluid 116. In a further embodiment, regions of the article 100 subjected to increased temperatures relative to other regions of the article 100 include a greater concentration of impingement apertures 112, impingement apertures 112 having larger cross-sectional areas 200, or both, to increase the impingement pressure, and, hence, optimize the temperature moderation effect of the fluid across the article 100.

In another embodiment, the impingement wall 108 and the article wall 104 include an arrangement and conformations of the plurality of impingement apertures 112 and the plurality of external apertures 114 to distribute the fluid 116 to generate a positive back-flow margin across each external aperture 114. In yet another embodiment, the hot gas path pressure varies along the external surface of the article 100, including, but not limited to, where the article 100 is an airfoil 122, and the pressure of each of the plurality of sub-cavities 120 is varied correspondingly so as to be greater than the hot gas path pressure at each external aperture 114. Sub-cavities 120 exhausting the fluid 116 through external apertures 114 where the hot gas path pressure is reduced may be optimized to have a lower pressure in the sub-cavities 120 while still maintaining a pressure in excess of the hot gas path pressure at the external apertures 114, thereby having an increased pressure drop across the corresponding impingement apertures 112 and having increased local cooling effectiveness.

Figure 3:
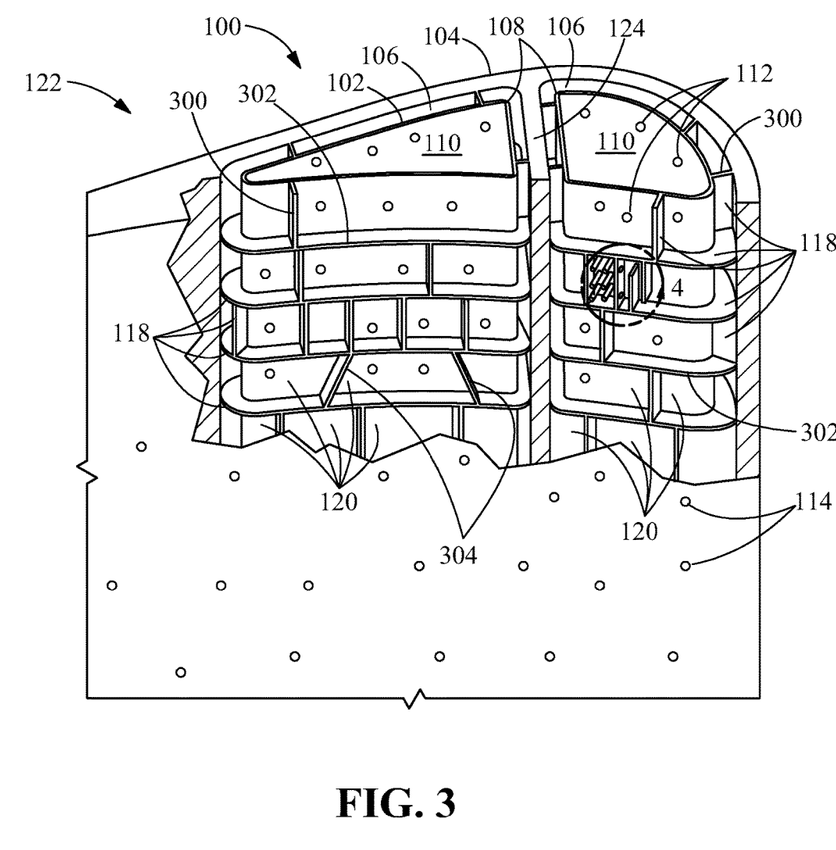
FIG. 3 is a cut-away perspective view of the article of FIG. 1, according to another embodiment of the present disclosure.

Referring to FIG. 3, in one embodiment, the plurality of post-impingement partitions 118 have any suitable post-impingement partitions 118 orientation, including, but not limited to, vertical partitions 300, horizontal partitions 302, and diagonal partitions 304. As used herein, "vertical", "horizontal" and "diagonal" reference the general orientation of a post-impingement partition 118 with respect to the article 100, and do not necessitate or imply a linear conformation for the post-impingement partition 118. Inclusion of vertical partitions 300, horizontal partitions 302, diagonal partitions 304, or combinations thereof, facilitates the optimization of the flow of the fluid 116 through the post-impingement cavity 106 and through the plurality of external apertures 114 based on the anticipated ranges of temperature and hot gas path pressure over varying areas of the article 100 during operating conditions.

Figure 4:
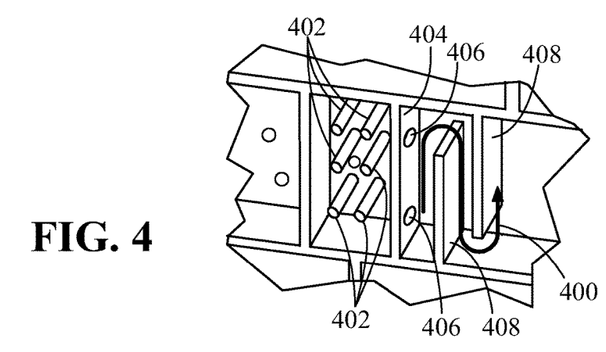
FIG. 4 is an expanded view of the cut-away perspective view of FIG. 3, according to another embodiment of the present disclosure.

Referring to FIG. 4, in one embodiment, the plurality of sub-cavities 120 include features for modifying the post impingement flow path 400 of the fluid. Such features include, but are not limited to, turbulators (including, but not limited to, pin banks or pedestals) 402, dividers 404 having flow restriction apertures 406, sequenced partial dividers 408 establishing a serpentine post impingement flow path 400, and combinations thereof. These features may further reduce or eliminate crossflow in the post-impingement cavity 106.

Figure 5:
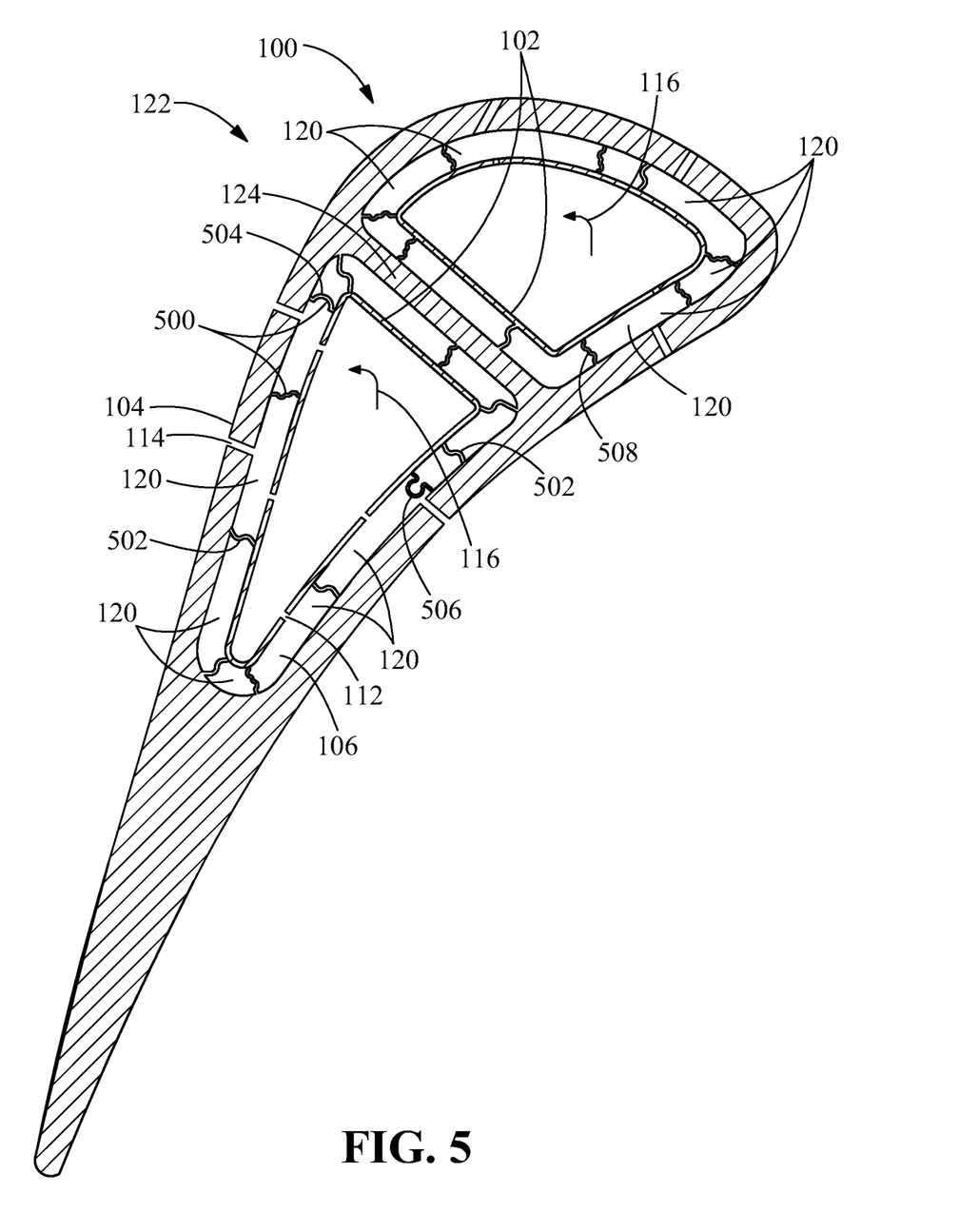
FIG. 5 is a cross-sectional view of an article, according to another embodiment of the present disclosure.
Figure 6:
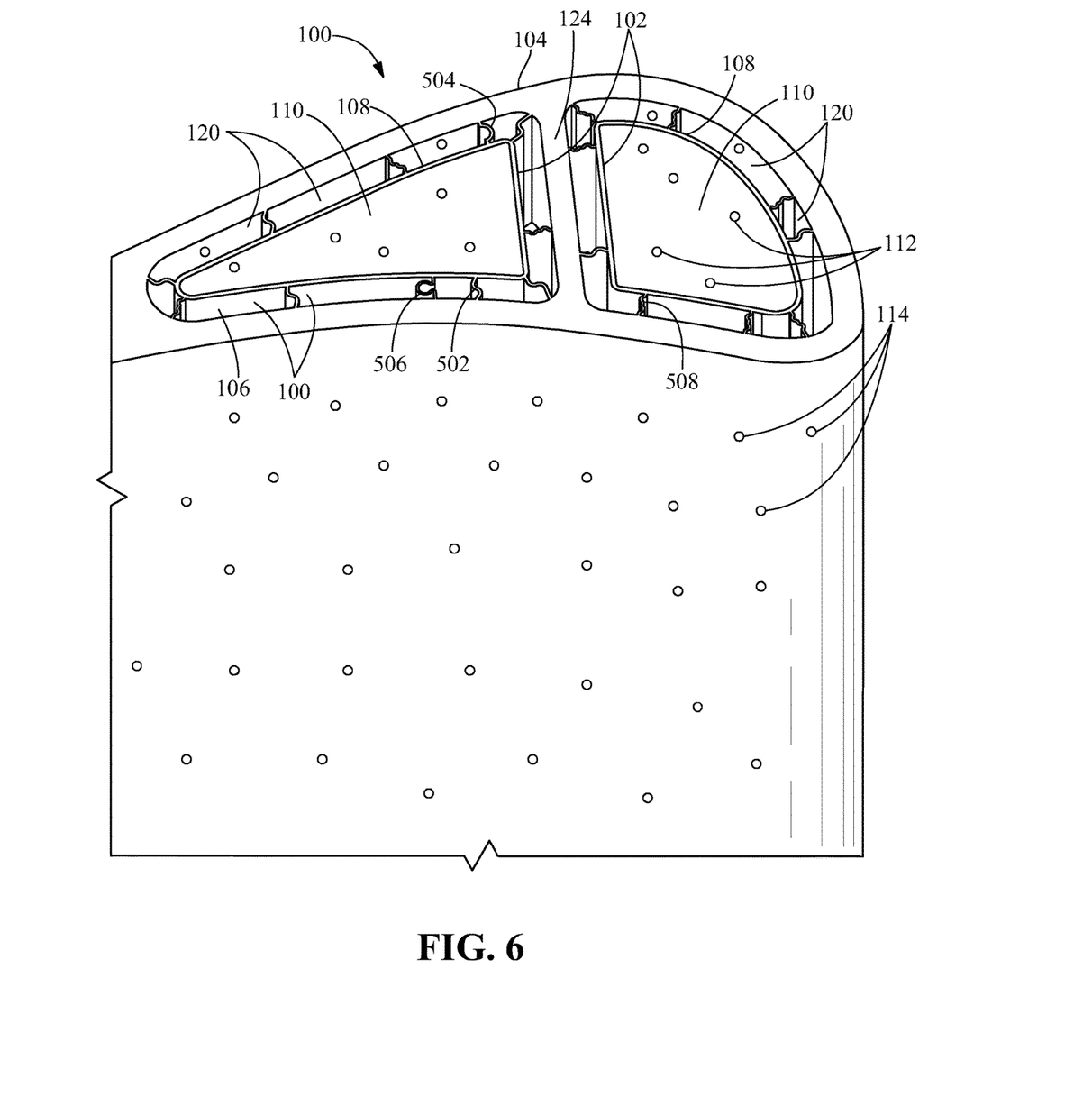
FIG. 6 is a perspective view of the article of FIG. 5, according to an embodiment of the present disclosure.
Figure 7:
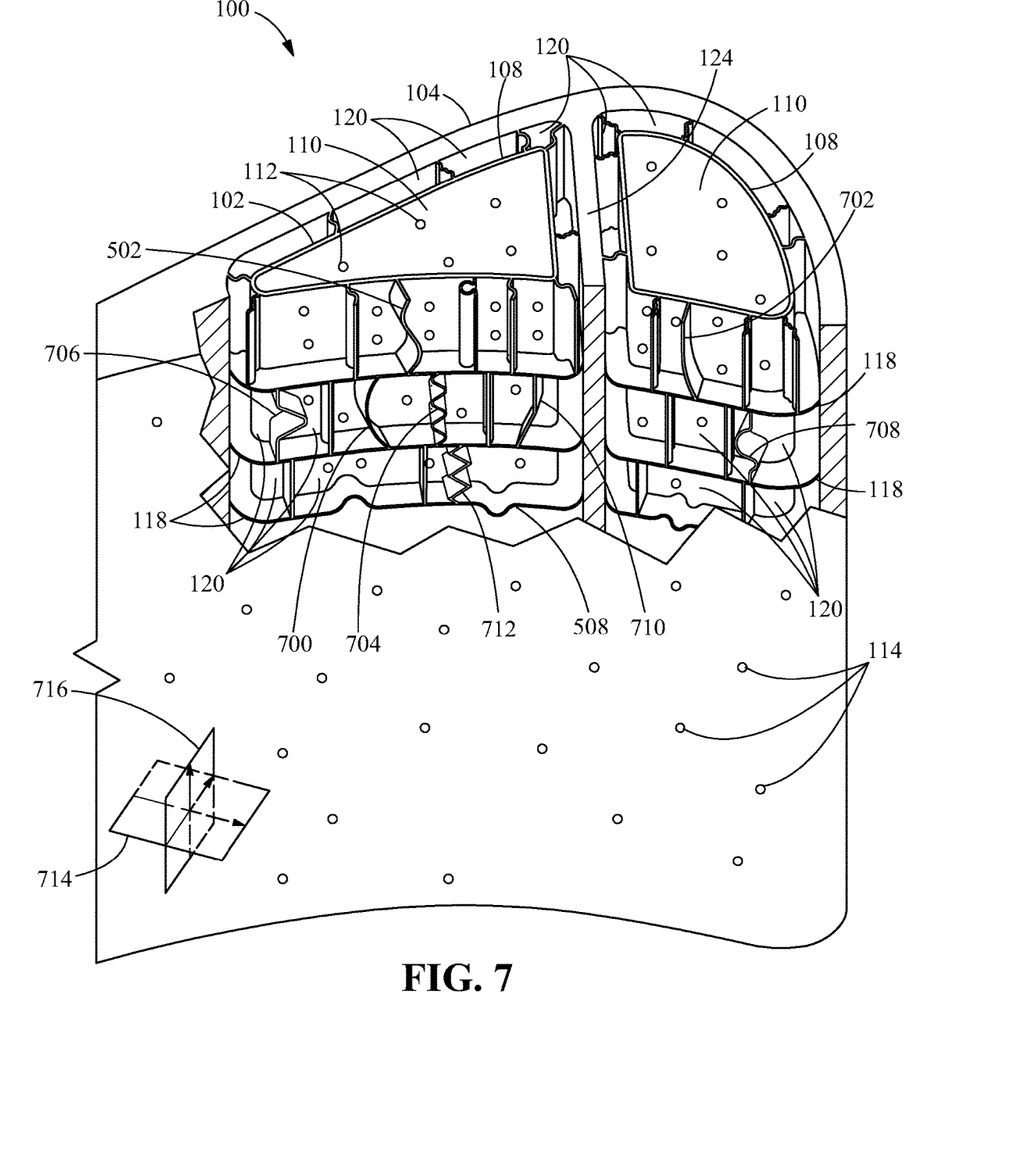
FIG. 7 is a cut-away perspective view of the article of FIG. 5, according to another embodiment of the present disclosure.

Referring to FIGS. 5-7, in one embodiment, the plurality of post-impingement partitions 118 include a non-linear conformation 500. Non-linear conformations 500 included, but are not limited to, s-shaped 502, c-shaped 504, omega-shaped 506, undulating 508, curved 700, partially curved 702, sinusoidal 704, Gaussian 706, asymmetrically curved 708, deflected 710, zigzagging 712, and combinations thereof. The non-linear conformation 500 of a post-impingement partition 118 may be non-linear with respect to the horizontal plane 714, the vertical plane 716 or both.

In a further embodiment, the non-linear conformation 500 of the plurality of post-impingement partitions 118 provides a flexible attachment of the manifold 102 to the article wall 104. The flexible attachment of the manifold 102 to the article wall 104 may accommodate differential thermal expansion, absorb mechanical stresses, or both.

Figure 8:
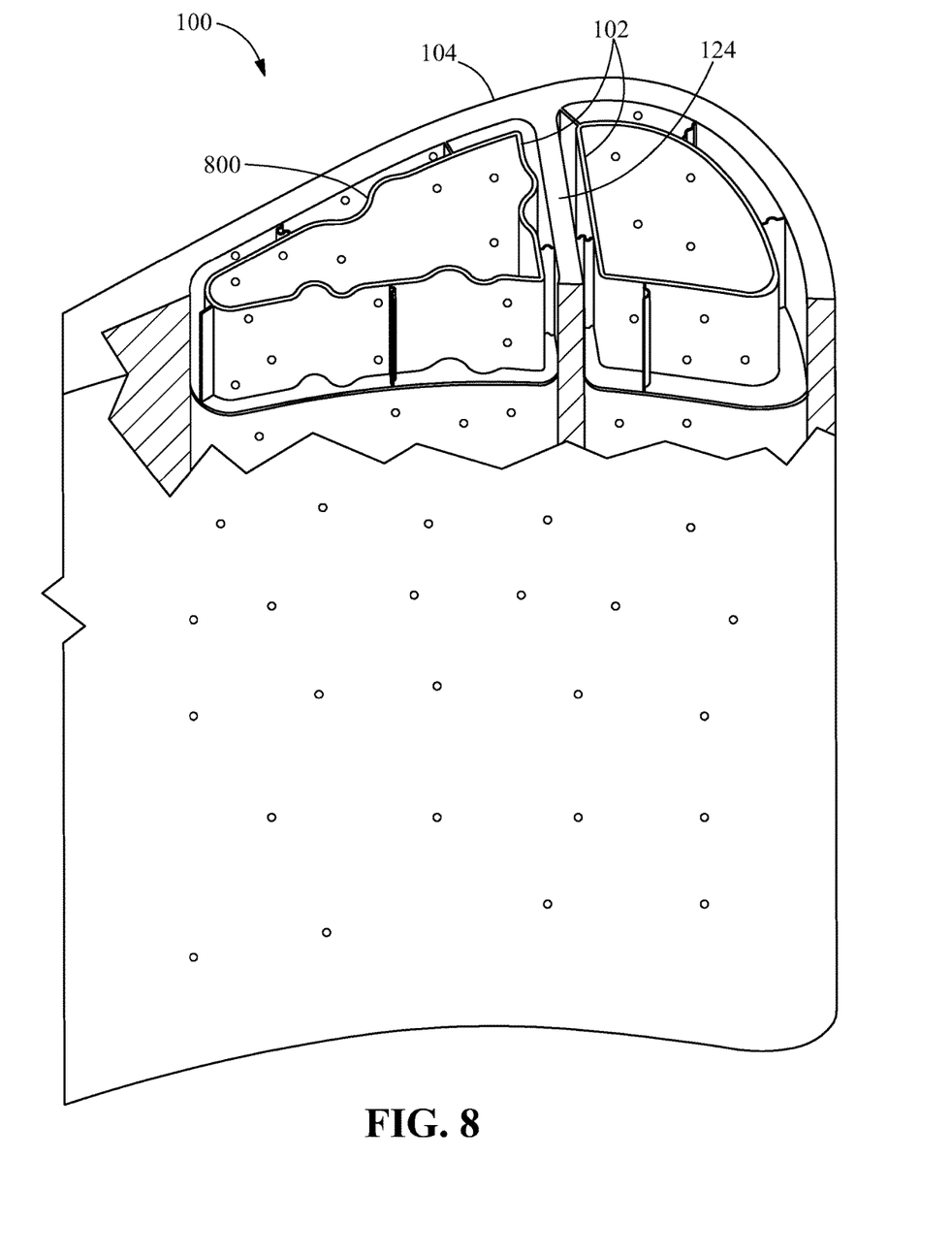
FIG. 8 is a cut-away perspective view of an article, according to yet another embodiment of the present disclosure.

Referring to FIG. 8, in one embodiment, the impingement wall 108 includes a wall non-linear conformation 800. The wall non-linear conformation 800 may accommodate differential expansion, absorb mechanical stresses, or both.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article, comprising:
   a manifold including an impingement wall, the impingement wall defining a plenum and a plurality of impingement apertures;
   an article wall including a plurality of external apertures and a structural spar;
   a post-impingement cavity disposed between the manifold and the article wall, the post-impingement cavity arranged to receive a fluid from the plenum through the plurality of impingement apertures and exhaust the fluid through the plurality of external apertures; and
   a plurality of post-impingement partitions dividing the post-impingement cavity into a plurality of sub-cavities, the plurality of post-impingement partitions hermetically separating the plurality of sub-cavities from one another,
   wherein the impingement wall, article wall and plurality of post-impingement partitions are integrally formed as a single, continuous article, and
   wherein the plurality of post-impingement partitions dividing the post-impingement cavity into the plurality of sub-cavities includes at least one post-impingement partition bridging between the manifold and the structural spar across the post-impingement cavity, and an arrangement selected from the group consisting of:
   at least one post-impingement partition having a non-linear conformation;
   at least one horizontal partition;
   at least one diagonal partition; and
   combinations thereof.

2. The article of claim 1, wherein the article is an airfoil.

3. The article of claim 1, wherein the plurality of impingement apertures are arranged and conformed to distribute the fluid to generate a higher heat transfer coefficient in a sub-cavity exposed to higher temperatures as compared to a sub-cavity exposed to lower temperatures.

4. The article of claim 1, wherein the plurality of impingement apertures and the plurality of external apertures are arranged and conformed to distribute the fluid to generate a positive back-flow margin across each external aperture.

5. The article of claim 1, wherein the plurality of post-impingement partitions include a non-linear conformation.

6. The article of claim 1, wherein the impingement wall includes a non-linear conformation between two, sequentially, of the plurality of post-impingement partitions, the non-linear conformation including an s-shaped curve, an omega-shaped curve, an undulating curve, a sinusoidal curve, a Gaussian curve, a zigzagging curve, or combinations thereof.

7. The article of claim 1, wherein the plurality of sub-cavities include features selected from the group consisting of turbulators, dividers having flow restriction apertures, sequenced partial dividers establishing a serpentine flow path, and combinations thereof.

8. An article, comprising:
   a manifold including an impingement wall, the impingement wall defining a plenum and a plurality of impingement apertures;
   an article wall including a plurality of external apertures;
   a post-impingement cavity disposed between the manifold and the article wall, the post-impingement cavity arranged to receive a fluid from the plenum through the plurality of impingement apertures and exhaust the fluid through the plurality of external apertures; and
   a plurality of post-impingement partitions dividing the post-impingement cavity into a plurality of sub-cavities, the plurality of post-impingement partitions hermetically separating the plurality of sub-cavities from one another,
   wherein the impingement wall, article wall and plurality of post-impingement partitions are integrally formed as a single, continuous article, and
   wherein the impingement wall includes a non-linear conformation between two, sequentially, of the plurality of post-impingement partitions, the non-linear conformation including an s-shaped curve, an omega-shaped curve, an undulating curve, a sinusoidal curve, a Gaussian curve, a zigzagging curve, or combinations thereof.

9. The article of claim 8, wherein the article is an airfoil.

10. The article of claim 8, wherein the plurality of impingement apertures are arranged and conformed to distribute the fluid to generate a higher heat transfer coefficient in a sub-cavity exposed to higher temperatures as compared to a sub-cavity exposed to lower temperatures.

11. The article of claim 8, wherein the plurality of impingement apertures and the plurality of external apertures are arranged and conformed to distribute the fluid to generate a positive back-flow margin across each external aperture.

12. The article of claim 8, wherein the plurality of post-impingement partitions include a non-linear conformation.

13. The article of claim 8, wherein the plurality of sub-cavities include features selected from the group consisting of turbulators, dividers having flow restriction apertures, sequenced partial dividers establishing a serpentine flow path, and combinations thereof.

14. The article of claim 8, wherein the plurality of post-impingement partitions includes an arrangement selected from the group consisting of:

at least one post-impingement partition having a non-linear conformation;
at least one horizontal partition;
at least one diagonal partition; and
combinations thereof.

15. An article, comprising:
a manifold including an impingement wall, the impingement wall defining a plenum and a plurality of impingement apertures;
an article wall including a plurality of external apertures;
a post-impingement cavity disposed between the manifold and the article wall, the post-impingement cavity arranged to receive a fluid from the plenum through the plurality of impingement apertures and exhaust the fluid through the plurality of external apertures; and
a plurality of post-impingement partitions dividing the post-impingement cavity into a plurality of sub-cavities, the plurality of post-impingement partitions hermetically separating the plurality of sub-cavities from one another,
wherein the impingement wall, article wall and plurality of post-impingement partitions are integrally formed as a single, continuous article, and
wherein the plurality of post-impingement partitions include a non-linear conformation.

16. The article of claim 15, wherein the article is an airfoil.

17. The article of claim 15, wherein the plurality of impingement apertures are arranged and conformed to distribute the fluid to generate a higher heat transfer coefficient in a sub-cavity exposed to higher temperatures as compared to a sub-cavity exposed to lower temperatures.

18. The article of claim 15, wherein the plurality of impingement apertures and the plurality of external apertures are arranged and conformed to distribute the fluid to generate a positive back-flow margin across each external aperture.

19. The article of claim 15, wherein the plurality of sub-cavities include features selected from the group consisting of turbulators, dividers having flow restriction apertures, sequenced partial dividers establishing a serpentine flow path, and combinations thereof.

20. The article of claim 15, wherein the plurality of post-impingement partitions includes at least one horizontal partition, at least one diagonal partition, or combinations thereof.

* * * * *